Oct. 2, 1956
R. F. KRUPP ET AL
2,764,995
SLIDING PLUG VALVE
Filed Aug. 18, 1952
3 Sheets-Sheet 1
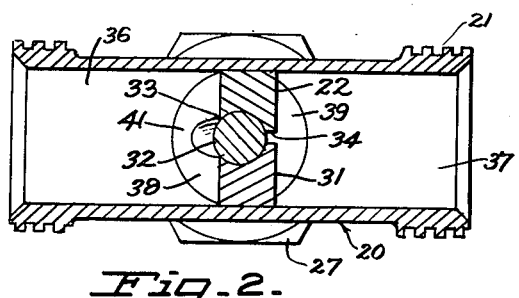
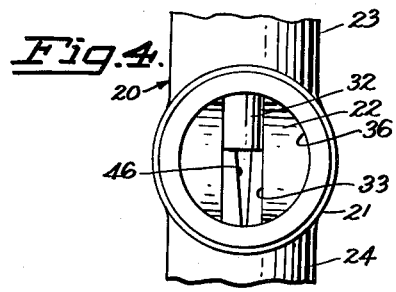
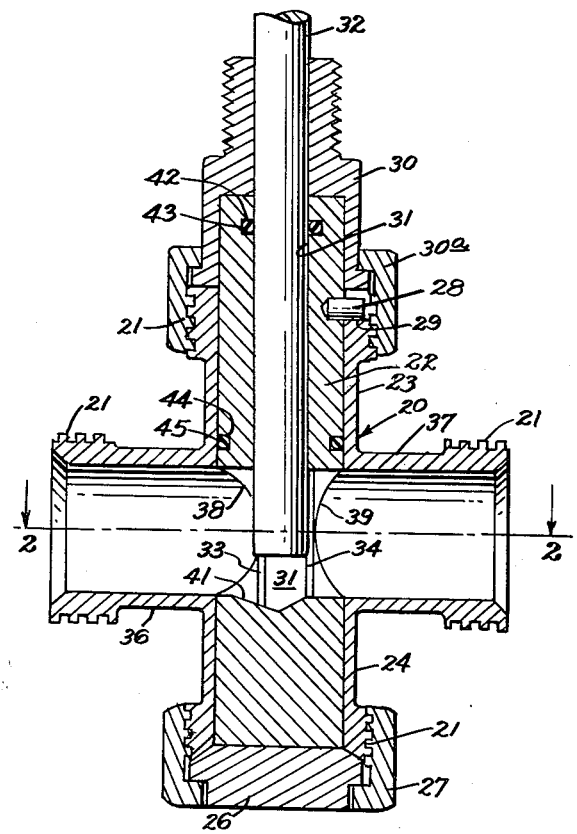
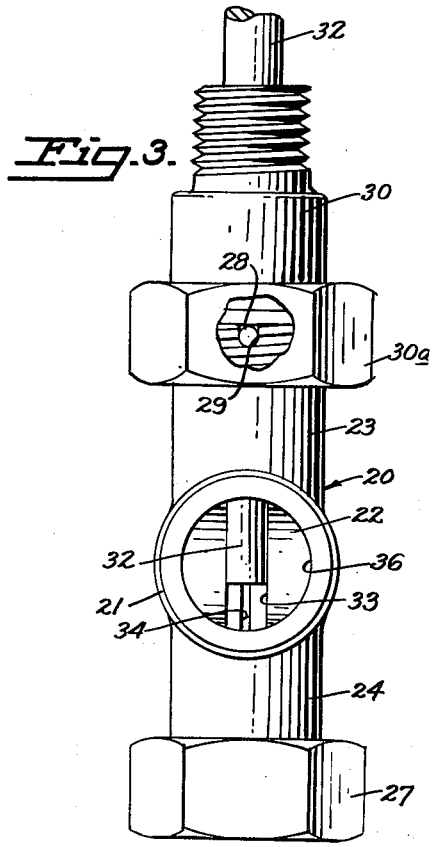
INVENTORS
ROBERT F. KRUPP
MARVIN H. WARDELL
BY *Townsend and Townsend*
ATTORNEYS

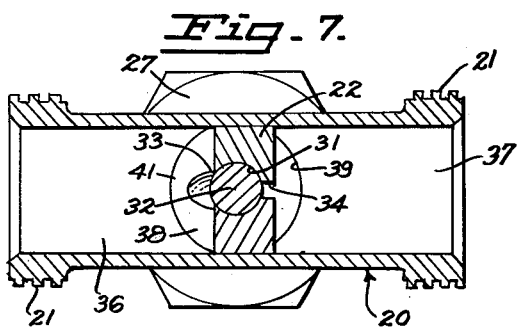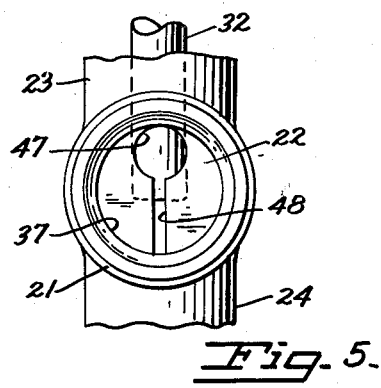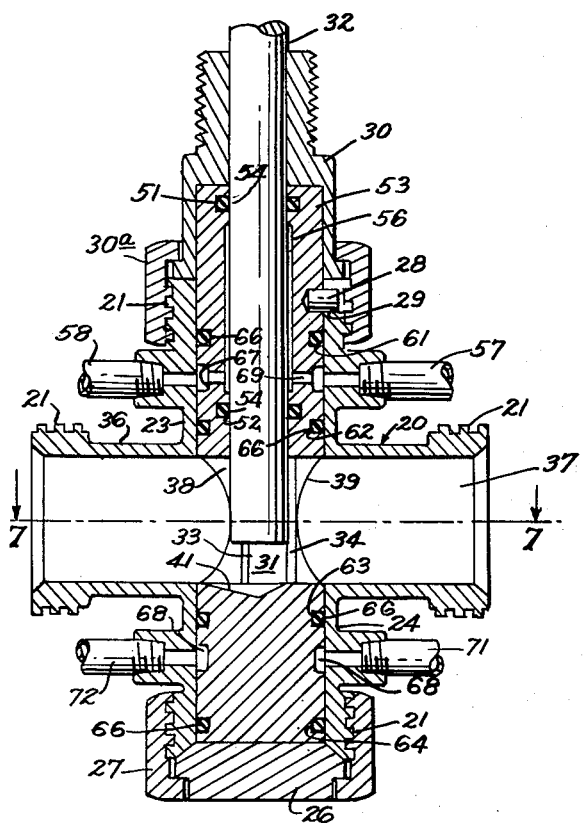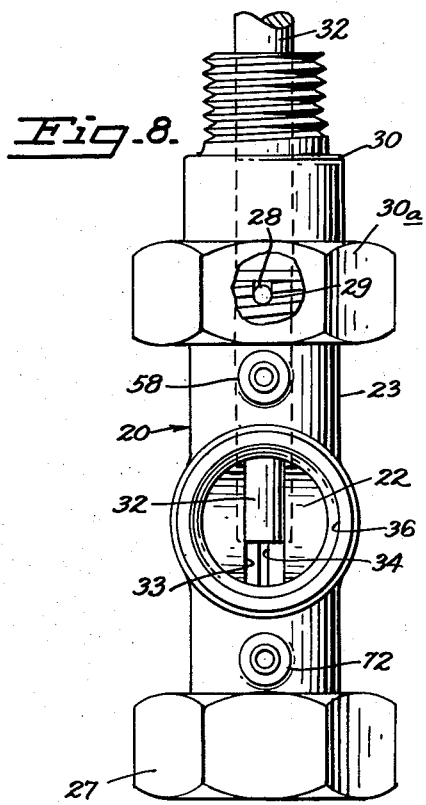

Oct. 2, 1956 R. F. KRUPP ET AL 2,764,995
SLIDING PLUG VALVE
Filed Aug. 18, 1952 3 Sheets-Sheet 3
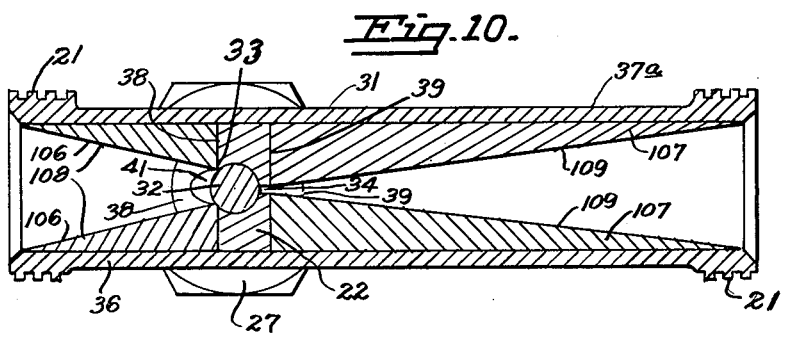
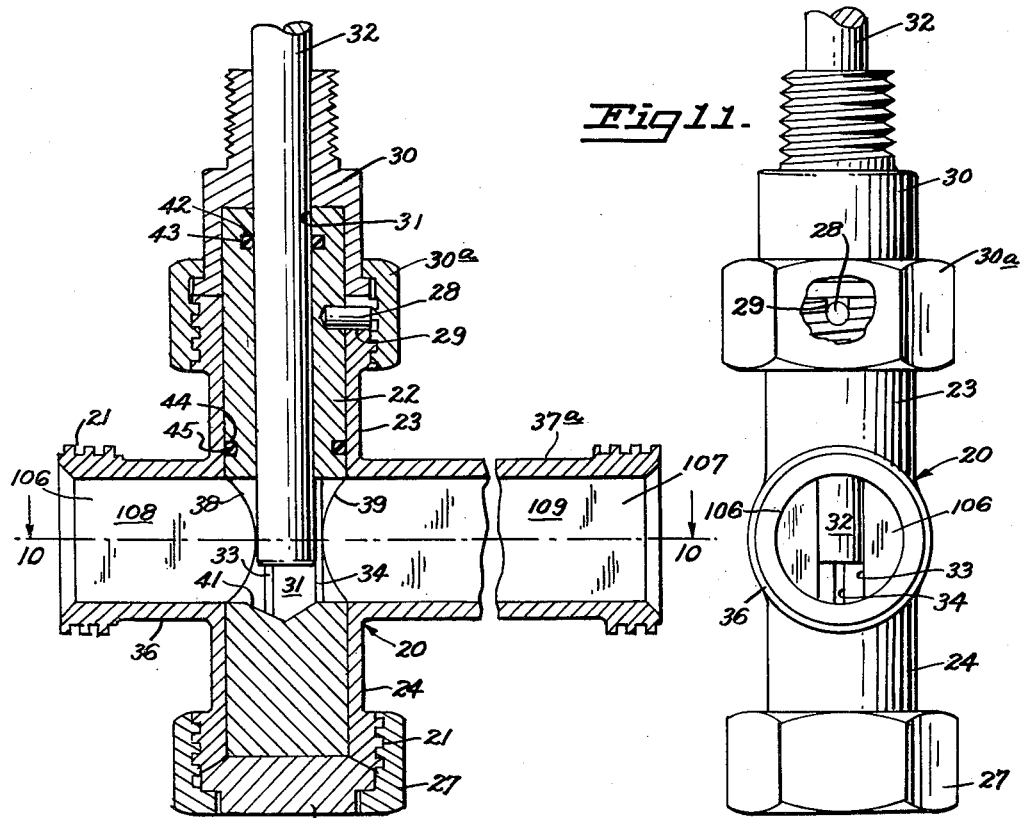
INVENTORS
ROBERT F. KRUPP
MARVIN H. WARDELL
BY
*Townsend and Townsend*
ATTORNEYS

United States Patent Office 2,764,995
Patented Oct. 2, 1956

2,764,995

SLIDING PLUG VALVE

Robert F. Krupp, San Lorenzo, and Marvin H. Wardell, Castro Valley, Calif., assignors to Gerber Products Company, Fremont, Mich., a corporation of Michigan Application August 18, 1952, Serial No. 305,058

11 Claims. (Cl. 137—241)

This invention relates to plug valves. More particularly the invention relates to a valve wherein a narrow slit port is provided extending transversely of the direction of flow, the flow through the slit port being regulated by means of a plug immediately behind the slit and slidable longitudinally with respect thereto. By moving the plug the area of the opening through the slit is increased or diminished and this accomplishes the metering function of the valve.

The instant invention comprises a sanitary valve for proportioning flow through a line. It is particularly suitable for low flow at either high pressure or low pressure. By use of the narrow slit ports, and a plug traveling the full length of the slit a wide range in the volume of flow may be obtained. Further, where a varying pressure is one of the conditions of flow, a constant flow rate may be obtained by adjustment of the plug position.

Another important feature of the invention is the fact that the valve is extremely sanitary in that it can be conveniently cleaned. The shape of the slit ports diminishes adherence of foreign matter within the body of the valve. The various assembled parts are so installed that they may be readily disassembled for convenient cleaning. Further, the valve tends to be self cleaning in use for the reason that the plug moving behind the slits dislodges foreign substances accumulating at the slits.

The instant invention also is ideally suited for incorporation of means whereby a constant sterile atmosphere is maintained within the valve by the use of resilient rubber rings sealing a zone of live steam or sterile water which prevents contaminants entering with the plug.

Still another important feature of the invention is the fact that a conventional sanitary cross pipe fitting may be used as the valve body with very slight modifications and an adaptor inserted through one arm of the cross to provide the valve structure. This results in a simple and inexpensive device which employs standard materials and few fabricated parts. The fabricated parts are inexpensive to manufacture, no special castings being required in certain forms of the valve hereinafter described.

Still another important feature of the invention is the adaptability of the valve to the employment of special shapes of inlet and outlet passages on either side of the inlet and outlet ports of the valve. The shapes of these passages may be of the nature which eliminates turbulence in the fluid flow through the valve. Further, it prevents sudden extreme changes in pressure of the product which would otherwise occur. In the processing of food products extreme pressure changes, sometimes referred to as "flashing," modify the taste, texture or appearance of the products. Where such modification of properties is undesirable, the employment of a shaped valve, as hereinafter described, and the elimination of sudden changes in pressure improves the final product. The fabrication of the inlet and outlet passages is considerably expedited by the use of standard fittings as hereinafter described.

Other objects of the present invention will become apparent upon reading the following specification and referring to the accompanying drawings in which similar characters of reference represent corresponding parts in each of the several views.

In the drawings:

Fig. 1 is a vertical midsection through the valve taken along the common axis of the four arms of the valve body.

Fig. 2 is a horizontal section take substantially along the line 2—2 of Fig. 1.

Fig. 3 is a side elevation as viewed from the left in Fig. 2.

Fig. 4 is a fragmentary side elevation showing a modified form of discharge slit port as viewed from the left in Fig. 2.

Fig. 5 is a fragmentary side elevation showing another modified form of discharge slit port as viewed from the right in Fig. 2.

Fig. 6 is a vertical midsection of a modified valve.

Fig. 7 is a horizontal section taken substantially along the line 7—7 of Fig. 6.

Fig. 8 is a side elevation as viewed from the left in Fig. 6.

Fig. 9 is a vertical midsection of another modified valve having inserts in the inlet and discharge arms providing conoid inlet and discharge passages.

Fig. 10 is a horizontal section taken along the line 10—10 of Fig. 9.

Fig. 11 is an end elevation as viewed from the left in Fig. 9.

As shown in the accompanying drawings, the instant invention is adapted to various modifications. In Figs. 1 to 3, inclusive, the invention is installed in a standard sanitary pipe fitting of the conventional cross shape, wherein there are four arms, the axes of which lie in a common plane, it being understood that one or more of the arms may be of greater length than the others. Threads 21 for pipe connections are formed externally on the extremities of the four arms. A metering adapter 22 of cylindrical shape extends down filling the first arm 23, through the central juncture of the four arms and into the diametrical opposite third arm 24. A pipe plug 26 is employed to close off the third arm held in place by a nut 27. In order to prevent rotation of the adapter 22 relative to the valve body, a pin 28 may be driven in the adapter, the pin being received in a groove 29 recessed in the top edge of the first arm 23. Adapter 22 is held in place by connector 30 screwed to the valve body by nut 30a.

The central axis of the adapter is bored out down through the part which extends into the center of the valve body and in the bore 31 thus formed there is received a slidable plug 32 with a close, sliding fit, said plug 32 being the means whereby the flow through the valve is regulated. Inlet and discharge slit ports 33 and 34 are provided communicating with the second and fourth arms 36 and 37 of the cross. The inlet port is formed by machining an arcuate recess 38 in the cylindrical wall of the adapter 22, the axis of rotation of the arcuate recess lying on the axis of the inlet arm 36 of the valve body. A narrow slit 33 is formed parallel to the axis of plug 32 between the bore 31 in the central axis and the arcuate recess 38, said slit 33 connecting said bore 31 with the inlet arm 36 of the valve. Similarly an arcuate recess 39 is formed in the discharge side of the adapter 22, the axis of rotation of the recess 39 lying on the axis of the discharge arm 37 of the valve. The discarge port narrow slit 34 is formed connecting bore 31 and discharge side of the valve. The width of the inlet slit 33 is considerably greater than that of the discharge slit 34 by reason of arcuate recess 38 being deeper than the corresponding recess 39. Hence the actual metering function of the valve is performed at the narrower slit, in this case the discharge slit 34. It will be observed particularly with reference to Fig. 3 that when plug 32 is in its extreme downward position the valve is completely closed and both inlet and discharge ports 33 and 34 are sealed closed. As the plug 32 is raised, the inlet and discharge arms 36 and 37 of the valve communicate through bore 31, the area of the opening of the inlet and discharge ports 33 and 34 increasing in direct proportion to the distance the plug 32 is retracted. The increase in area of the smaller of the two ports 34 performs the metering function which has been heretofore described. The bottom of the inlet passage is recessed as indicated by reference numeral 41 to permit escape of fluid as plug 32 seats and hence permits positive, rapid seating of said plug.

In order to seal off the interior of the valve from atmosphere, a groove 42 may be recessed in bore 31 adjacent the top of adapter 22 and a groove 44 recessed in the outer surface of adapter 22 adjacent the bottom of arm 23. Resilient rubber rings 43 and 45 are inserted in grooves 42 and 44, respectively, and these seal against the mating parts. Thus ring 42 seals plug 32 and adapter 22 against atmospheric pressure and contamination through bore 31 and ring 44 seals adapter 22 and arm 23.

As shown in Fig. 4, instead of a narrow slit 34 of parallel sides being employed in the discharge port, the edges of modified discharge slit 46 may be tapered so that the characteristics of the flow of the valve are changed. Therefore, for every increment in the amount of retraction of the plug shown in the valve of Fig. 4 a considerably greater increment in the area of the valve results. It will be understood that the shape of the slit opening may otherwise be considerably modified depending upon the desired characteristics of the valve. Thus as shown in Fig. 5 a large hole 47 is formed in the upper end of slit 48 adjacent the top of the travel of the plug 32 resulting in a keyhole profile. This is particularly desirable where a large flow is desired at certain times. An example of the latter situation is when it is desired to sterilize the line by using live steam; upon full opening of the valve shown in Fig. 5 the passage of steam through the line is considerably augmented. Another use for the keyhole profile is where it is desired to fill a receptacle rapidly at the beginning of operations, but the flow is diminished after initial filling.

When it is desired to maintain sterile conditions at all times when the line is in operation a modified construction such as is shown in Figs. 6 to 8 may be employed. In order to prevent contamination of the interior of the valve as the valve plug 32 is moved inwardly carrying contaminating substances lodging on its surface, means is provided to sterilize the plug. For this purpose a pair of grooves 51 and 52 are recessed into the bore in the adapter 53. Resilient rubber sealing rings 54 commonly termed "O rings" of a diameter slightly greater than the depth of said grooves 51 ad 52 are installed in said grooves bearing against the plug 32 and the walls of the grooves. Between grooves 51 and 52 an elongated third groove is recessed, and said elongated groove 56 communicates with a live steam inlet line 57 and a discharge line 58. A constant flow of live steam in groove 56 is maintained and thus as plug 32 is projected into the valve body the surface of the plug comes into contact with live steam and is sterilized. For proper sterilization the length of groove 56 is one and one-quarter times the travel of the plug 32.

In Figs. 6 to 8 sterile atmosphere is maintained within the valve body through the joints at the first and third arms 23 and 24 of the cross 20 by similarly employing grooves 61, 62, 63 and 64 and resilient rings 66 on the exterior of adapter 53. Between pairs of rings 66 are steam grooves 67 and 68. The steam groove 67 in the first arm 23 communicates through duct 69 with the steam groove 56 on the interior. Separate steam inlet and discharge fittings 71 and 72 are provided for groove 68.

A modification of the invention disclosing a manner of obtaining a desired shape of the inlet and discharge passages of the valve is illustrated in Figs. 9 to 11 wherein a sanitary cross pipe fitting 20 is employed for the valve body, the discharge arm 37a of the cross 20 being longer than the other arms. In the modification of Figs. 9 to 11 an inexpensive means for fabricating the inlet and discharge passages is provided. Two complementary inserts 106 are inserted in the inlet passage and two complementary inserts 107 are inserted in the discharge passage. The inserts 106 and 107 are cylindrical on their exterior conforming to the interior of arms 36 and 37 of the cross and on their interior sides are flat, wedge shapes and conform to the shape of one-half of the valve inlet passage, the plane of cleavage being a central plane through the four arms of the valve. The flat surfaces of the inlet and discharge passages are designated 108 and 109, respectively. The thickness of the inserts 106 and 107 at their inner ends is such that the distance between the opposed surfaces 108 and 109 when in position is that of the width of the inlet and discharge port slits 33 and 34. The arcuate inner ends of the inserts fit into the arcuate recesses 38 and 39 in the adapter 22 through which the plug 32 passes. The inserts 106 and 107 narrow to a thin edge adjacent the outer ends of the valve body. It will thus be seen that by means of the two complementary inserts 106 in arm 36 the desired gradually converging shape of inlet passage is obtained in the modification of Figs. 9 to 11 without serious and costly manufacturing problems being raised. Similarly, inserts 107 in arm 37a provide the same shape of discharge passage. The shape of the inlet and outlet passages, as described, has important advantages over other shapes of inlet and discharge passages in reducing turbulence, eliminating flashing and promoting sanitation while the primary advantages of the preceding modifications are maintained. Hence the wide variation in flow which is made possible by the slit ports and sliding plug is still maintained and the valve has the wide range of operation which is inherent in the preceding modifications. The described shape has the advantage of gradually converging and diverging sidewalls of the inlet and outlet passages which merge into the slits of the ports.

Although the present invention has been described in some detail by way of illustration and example for purposes of clarity of understanding, it is understood that certain changes and modifications may be made within the spirit of the invention and scope of the appended claims.

We claim:

1. In a valve, a body in the shape of a cross having four hollow arms spaced substantially 90° apart and all lying in a common plane, a first of said arms comprising an inlet arm, the directly opposite third of said arms comprising a discharge arm, an intermediate second arm comprising an actuating arm, and the fourth arm being aligned with said second arm, a plug closing off said fourth arm, an adapter extending through said second and fourth arms, said adapter being formed with a continuous, cylindrcial, central bore extending from the outer end of said second arm through the zone of intersection of said four arms and into said plug, said adapter being formed with an elongated inlet slit and an elongated outlet slit between said central bore and the outer diameter of said adapter, said inlet slit facing said first arm and said outlet slit facing said third arm, said slits extending parallel to said bore and across the zone of intersection of said four arms, a rigid solid rod slidable in said central bore in an axial direction, the effective opening of said slits increasing and decreasing as said rod is projected into and retracted from said bore, said inlet slit being of substantially greater cross-sectional area than said discharge slit and a smooth contoured recess in the bottom of said inlet passage extending through the base of said inlet slit and into the base of said bore in said adapter to permit escape of fluid whereby said rod can be rapidly and positively seated in the base of said bore in said adapter.

2. A valve according to claim 1 in which at least one of said slits has parallel sides.

3. A valve according to claim 1 in which at least one of said slits has sides diverging outwardly from bottom to top.

4. A valve according to claim 1 in which at least one of said slits has a keyhole profile.

5. A valve according to claim 1 in which there is further provided a pair of spaced apart, recessed annular first grooves in said bore, a resilient ring in each of said grooves each bearing against the wall of the groove in which it is positioned and against said rod, an elongated annular groove recessed in said bore intermediate said first grooves, and a steam inlet line communicating with said elongated groove, whereby said plug is sterilized by live steam as it is projected into the body of said valve.

6. A valve according to claim 1 in which the interior of said discharge arm is in the shape of a conoid.

7. A valve according to claim 1 in which the interior of said inlet arm is in the shape of a conoid.

8. A valve according to claim 1 in which the interiors of said inlet and discharge arms are in the shape of conoids.

9. A valve according to claim 1 in which there is further provided a first insert and a second insert in one of said arms, said inserts parting in a central plane, said inserts together establishing a conoid shape in the exterior of said arm.

10. A valve according to claim 1 in which one of the meeting surfaces between said second arm and adapter is formed with a pair of spaced annular recessed grooves and an intermediate groove between said first two grooves, and in which there is further provided a resilient ring in each of said first mentioned grooves bearing against the wall of the groove in which it is positioned and the opposite member, and a steam inlet and a steam discharge line communicating with said intermediate groove.

11. In a valve as claimed in claim 1, said inlet and outlet passages having respectively gradually converging and diverging side-walls which smoothly merge into said inlet and outlet slits for reducing turbulence of flow through said valve, eliminating flashing and promoting sanitation.

References Cited in the file of this patent
UNITED STATES PATENTS

| | | |
|---|---|---|
| 1,004,845 | Bohme | Oct. 3, 1911 |
| 1,435,921 | Grossenbacher | Nov. 21, 1922 |
| 1,665,306 | Kennington | Apr. 10, 1928 |
| 1,805,106 | Robinson | May 12, 1931 |
| 1,850,850 | Peterson | Mar. 22, 1932 |
| 2,014,642 | Andrews | Sept. 17, 1935 |
| 2,290,251 | Saunders | July 21, 1942 |
| 2,374,336 | D'Arcey | Apr. 24, 1945 |
| 2,380,631 | Cones | July 31, 1945 |
| 2,651,320 | Hirsch | Sept. 8, 1953 |